Nov. 5, 1940. C. C. LARSEN Re. 21,617

AUTOMATIC STOKER

Original Filed May 15, 1934 5 Sheets-Sheet 1

Fig. 1. C. C. Larsen

By Clarence A. O'Brien
Attorney

Nov. 5, 1940. C. C. LARSEN Re. 21,617

AUTOMATIC STOKER

Original Filed May 15, 1934 5 Sheets-Sheet 2

Inventor

C. C. Larsen

By Clarence A. O'Brien

Attorney

Nov. 5, 1940. C. C. LARSEN Re. 21,617

AUTOMATIC STOKER

Original Filed May 15, 1934 5 Sheets-Sheet 3

Inventor

C. C. Larsen

By Thomas A. O'Brien

Attorney

Nov. 5, 1940. C. C LARSEN Re. 21,617

AUTOMATIC STOKER

Original Filed May 15, 1934 5 Sheets-Sheet 4

Inventor

C. C. Larsen

By Clarence O'Brien

Attorney

Nov. 5, 1940. C. C. LARSEN Re. 21,617

AUTOMATIC STOKER

Original Filed May 15, 1934 5 Sheets-Sheet 5

Inventor

C. C. Larsen

By Clarence A. O'Brien

Attorney

Reissued Nov. 5, 1940 Re. 21,617

UNITED STATES PATENT OFFICE 21,617

AUTOMATIC STOKER

Clarence C. Larsen, Bismarck, N. Dak., assignor to Lignite Combustion Engineering Corporation, a corporation of North Dakota Original No. 2,055,579, dated September 29, 1936, Serial No. 725,810, May 15, 1934. Application for reissue September 28, 1938, Serial No. 232,192

2 Claims. (Cl. 110—115)

This invention relates to stokers for furnaces, and more particularly to a coal feeding mechanism therefor.

The principal object of the invention is to provide an automatic stoker that is simple in construction, dependable in operation and so designed as to be swung freely into and out of operative position with respect to the furnace.

The invention, together with its objects and advantages, will be best understood from a study of the following description taken in connection with the accompanying drawings, wherein.

Figures 3, 8:
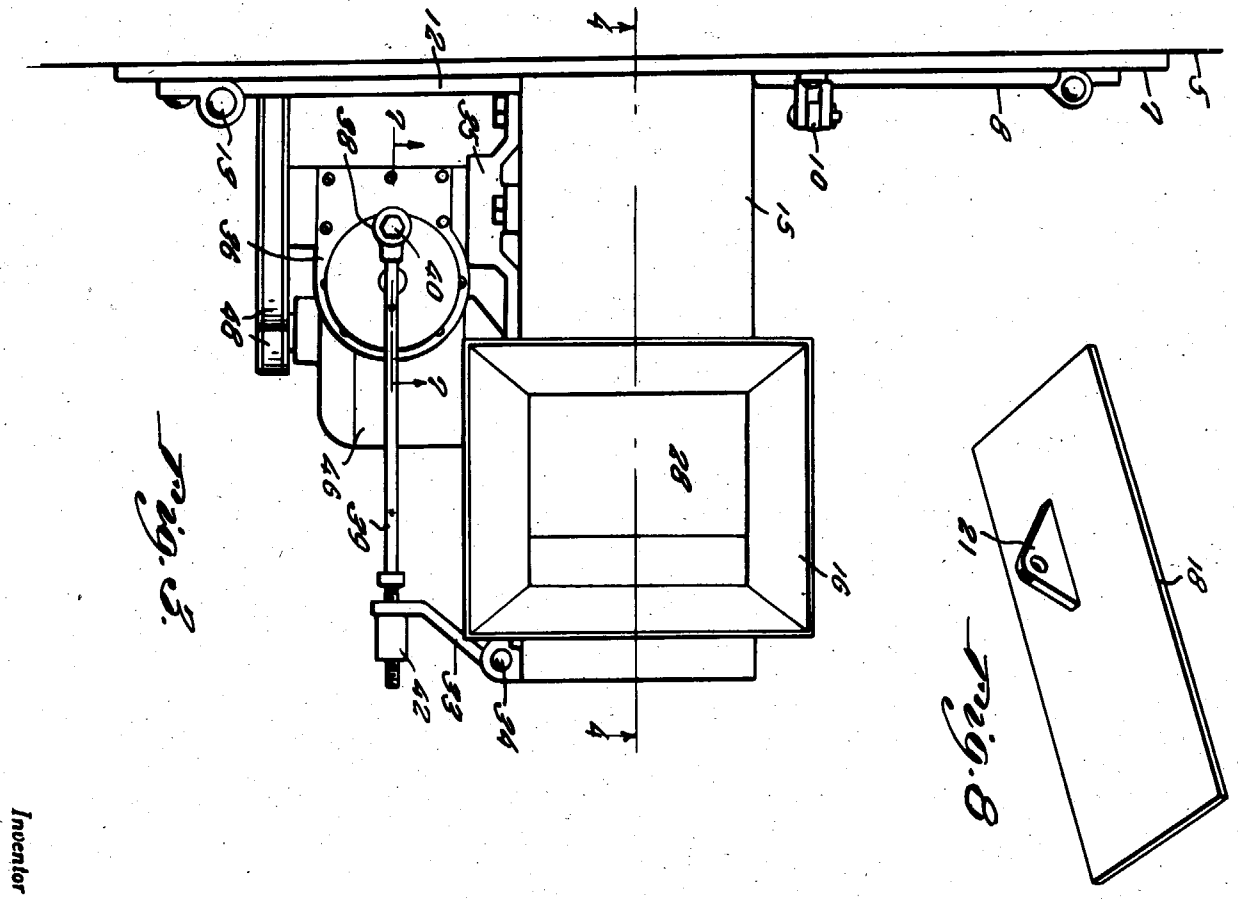
Figure 3 is a top plan view of the stoker.
Figure 4:
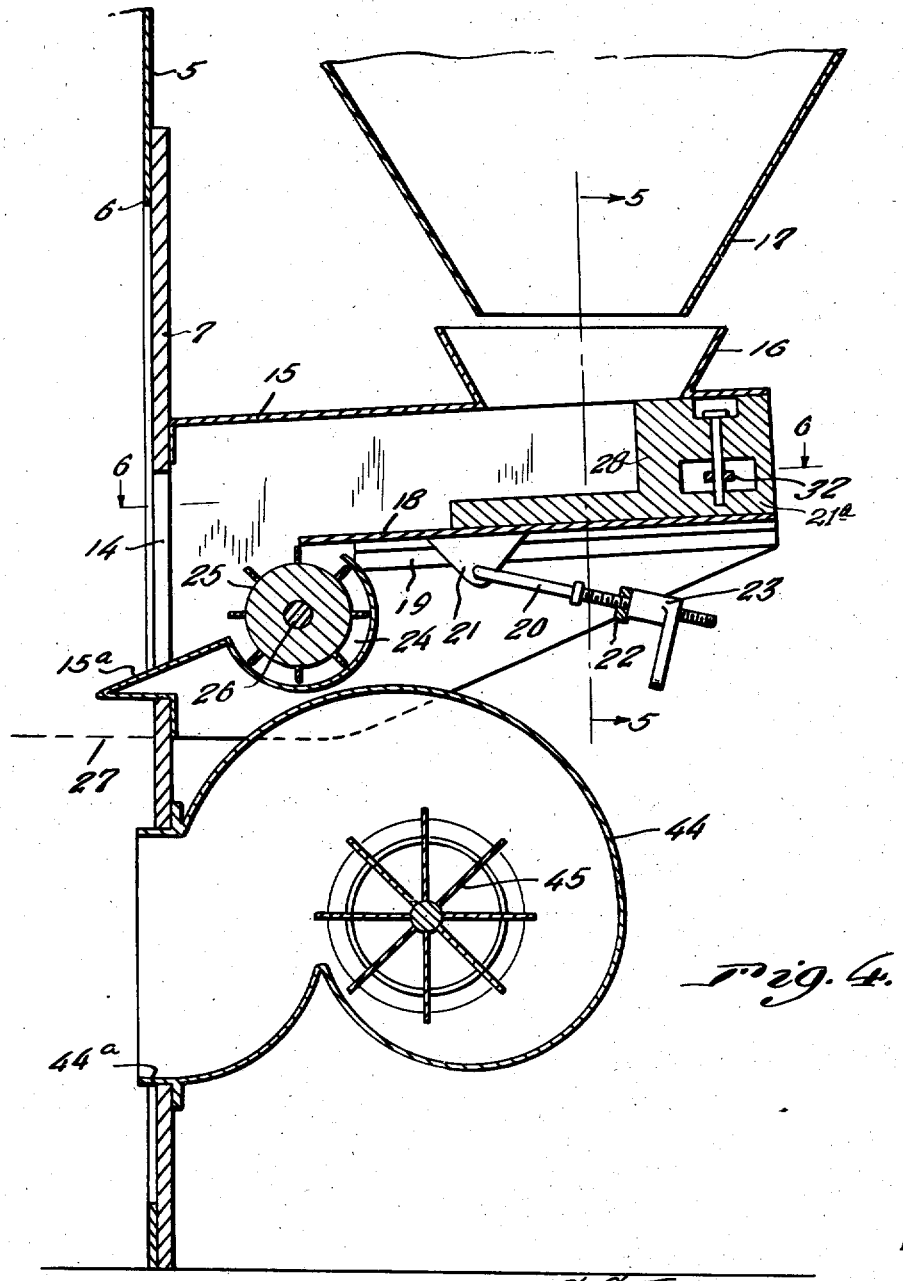
Figure 7:
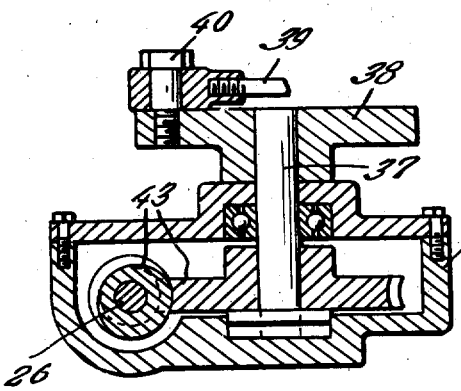

Figures 4 and 7 are sectional views taken substantially on the lines 4—4 and 7—7, respectively, of Figure 3.

Figure 5:
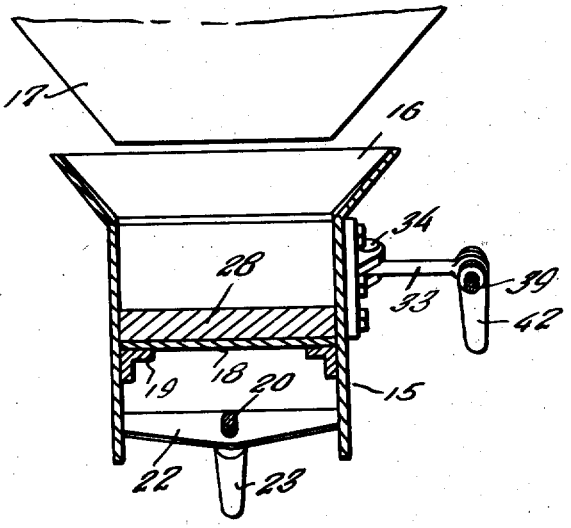
Figure 6:
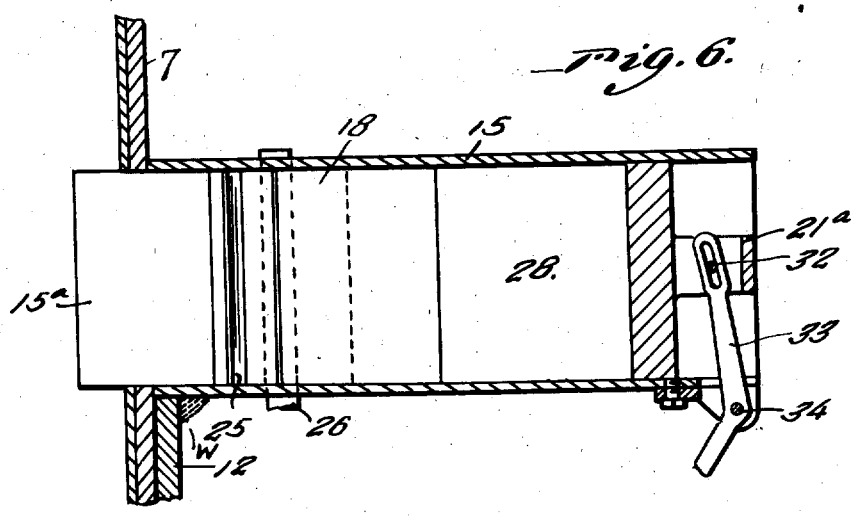

Figures 5 and 6 are detail sectional views taken substantially on the lines 5—5 and 6—6, respectively, of Figure 4, and Figure 8 is a perspective view of a reciprocating plate forming part of the feed mechanism.

Referring to the drawings by reference numerals, it will be seen that in accordance with the present invention, a portion of the wall 5 of a furnace is provided with an opening 6 over which is placed an attaching plate 7. The plate 7 is provided with an inspection door 8 and a clean-out door 9. Suitable latch means 10 is provided for the door 8, while latch means 11 is provided for the door 9.

A supporting plate 12 is hinged to the aforementioned plate 7, as at 13, and mounted on the plate 12 adjacent its free end for alignment with the feed opening 14 provided in the plate 7 is a feed casing 15 of suitable construction. In the top thereof, the casing 15 is provided with a funnel-shaped inlet 16 that aligns with the hopper 17 for conducting the coal from the hopper into the feed casing 15.

Mounted for reciprocation within the feed casing 15 and at a slight incline, is an adjustable plate 18 operating on guides 19. For adjusting the plate 18, there is provided a bolt 20 that is pivoted at one end to a lug 21 depending from the plate 18 and has a threaded free end operating through an aperture in a cross bar 22 extending between opposite sides of the casing 15. A hand nut 23 is threadedly engaged with the free end of the adjusting bolt 20.

Inwardly from the discharge plate 15a of the feed casing 15, said casing, at the bottom thereof, is provided with a trough-like portion 24 in which operates a rotary beater 25 mounted on a shaft 26. The plate 18, obviously, may be adjusted for exposing the desired portion of the periphery of the beater 25 to control the point of contact of the coal on the periphery of the beater, thereby controlling the velocity imparted to the particles of coal passing over the beater which velocity in turn will control the distance which the particles of coal will be thrown by the beater. In this connection, it will be noted that the discharge plate 15a of the casing extends into the furnace slightly above the grate line 27. The mechanism for driving the beater 25 will be hereinafter more fully referred to.

Mounted for reciprocation within the casing 15 and across the inlet mouth 16 of the casing is a fuel feeding ram 28. The ram 28 is moved along the plate 18, and at the rear end thereof, the ram 28 is provided with a lug or enlargement 21a which has a pin and slot connection, as at 32 with one arm of a lever 33. The lever 33, intermediate its ends, is pivoted between lugs projecting laterally from the casing 15, as at 34.

Supported from one side of the casing 15 through the medium of a bracket 35 is a gear case 36 clearly shown in Figure 7. Extending through the top of the gear case 36 is a stub shaft 37 which, on its upper end, is provided with a disk 38 equipped with a crank pin 40 to which is connected one end of a connecting rod 39. The connecting rod 39 has a threaded end which extends through the apertured free arm of the lever 33, which end of the lever 33 is maintained in operative engagement with the connecting rod 39 through the medium of a fixed collar 41 on the rod 39 and a hand nut 42 screw-threaded on the free end of the rod 39. By means of this hand nut 42, the amount of lost motion between the collar 41 and the hand nut 42 may be controlled, this in turn controlling the travel of the ram 28, which again in turn will control the amount of coal moved forward by the ram 28 by each forward movement of said ram.

The aforementioned shaft 26 for the beater 25 also extends through the gear casing 36, and that part of the shaft 26 which extends through the gear casing 36 is connected with the aforementioned shaft 37 through the medium of suitable gearing 43.

Mounted on the plate 7, below the feed casing 15, is a blower which includes a suitable blower casing 44 having a discharge 44a extending through a suitable aperture in the plate 7, and arranged within the casing 44 is the blower fan 45 mounted on an extension of the shaft of a motor 46.

Figure 1:
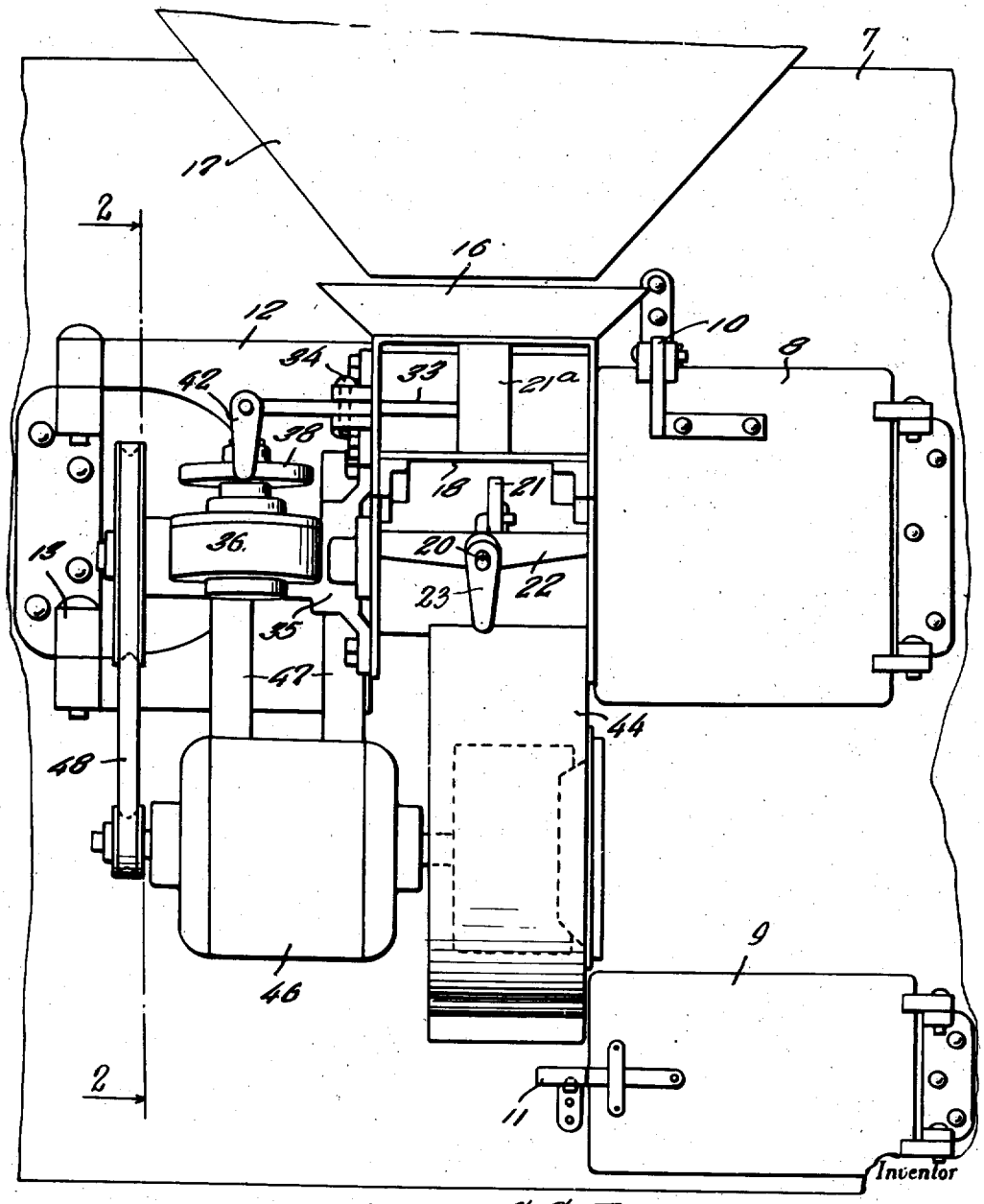
Figure 1 is a front elevational view of the stoker.
Figure 2:
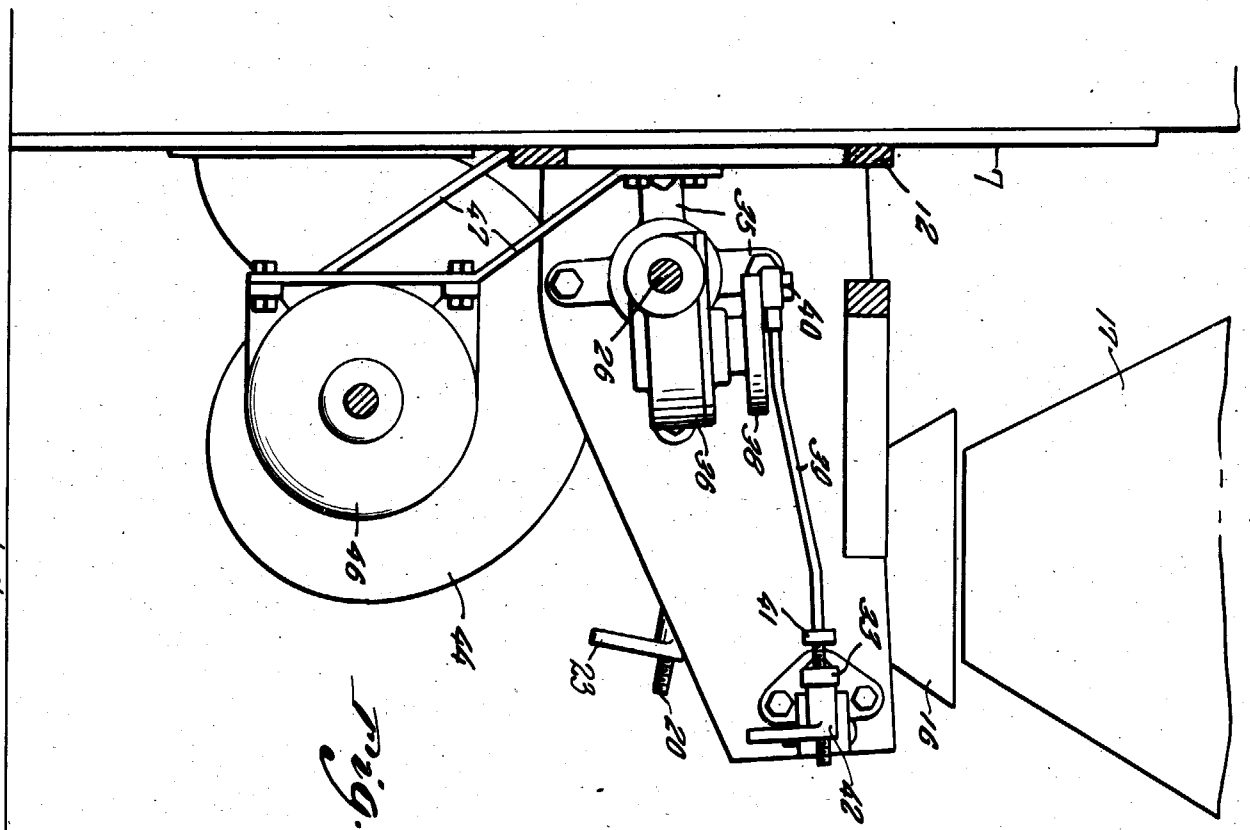
Figure 2 is a detail view taken approximately on the line 2—2 of Figure 1.

The motor for driving the fan 45 is suitably supported by suspension brackets 47. The brackets 47 are secured at their upper ends to the plate 12, and in this connection it will be understood that the blower casing 44 is supported from the feed casing 15, being welded or otherwise secured to one side of the casing 15 (see Figure 1), so that all of the parts will swing with the attaching plate 12 as a unit. Casing 15 is welded or otherwise secured to plate 12 as at *w*.

The motor 46 has a belt and pulley drive connection 48 with the free end of the beater shaft 26 and thus it will be apparent that the blower, the beater 25 and the fuel feeding ram 28 are all driven from the one motor 46.

It will be understood that the stoker may be employed with any suitable automatic control equipment, and in operation, when the equipment calls for heat, the motor 46 will be automatically started. The drive from the motor is then transmitted to the beater 25 and the ram 28, with the result that the beater 25 will continuously rotate and the ram 28 reciprocates. The coal will feed by gravity from the hopper 17 through the throat 16 into the feeding casing 15 and by the ram 28 will be forced forwardly toward the discharge plate 15*a* of the feed casing 15. The coal thus forced toward the plate 15*a* will pass from the plate 18 onto the beater 25 to be directed by the beater forwardly and through the opening 14 in the plate 7 into the fire box of the stove.

Attention is called to the fact that as best shown in the drawings Fig. 4, the advancing face of the ram 28 is stepped to form a bottom advance step and a top step behind the bottom step and by reason of the stepped advancing face of the ram a peculiarly beneficial feeding action is obtained. The bottom step of the ram working over the plate 18 forms a fuel pushing finger extending well in advance of the top step and therefore the ram is given considerable length so that it is properly guided without undue side friction in the feed casing under the action of the swinging lever 33. The top of the bottom step forms a ledge to prevent heavy avalanche of fuel directly onto the plate 18 from the inlet 16 while the provision of the notch formed by the top of the bottom step and the advancing face of the top step permits the passage of large chunks of fuel and foreign material into the feed casing 15 without clogging or obstruction. The fuel passes from inlet 16 onto the ledge of the bottom step and is advanced along the feed casing while being carried by the ram without frictional engagement between the fuel and plate 18, whereupon at the end of the advancing stroke of the ram and as the retracting stroke takes place the fuel spills from the ram onto the plate 18. On the next advancing stroke the advancing end of the bottom step pushes the fuel resting on plate 18 along the plate to feed it in regulated amount to the beater 25. With this arrangement there is always air space at the furnace end of the feed casing due to the natural angle of repose of the fuel so that the furnace end of the fuel casing does not become jammed with fuel. The passage formed by the casing 15 with plate 18, and the ram 28 are both rectangular in transverse cross section and the fuel is thus fed evenly to all parts of the beater 25. By reason of all these facts the stoker has great feeding capacity, the fuel is uniformly fed in predetermined amount and the ram can be properly actuated by expenditure of but little power, but a small quantity of fuel being pushed forward by the bottom step of the ram and the balance of the fuel being carried forwardly by the ram.

Having thus described the invention, what is claimed as new is:

1. A stoking device comprising a supporting plate adapted to be hingedly mounted on a furnace wall, a fuel feed casing mounted on said plate for movement therewith, said casing being provided with an inlet and an outlet for granular fuel, and having at said outlet a horizontal wall extension merging into an integral inclined plate merging at its upper end internally of the casing into a substantially cylindrical trough extending transversely of said casing, a rotary beater in said trough for projecting fuel through said outlet, a pair of opposed inclined guide members arranged in said casing and terminating at their lower ends adjacent to said trough, a bottom plate for said casing slidably engaging with and supported by said guide members, said bottom plate adapted to be projected across said trough above said beater to control the delivery of fuel to the latter, means for adjusting said bottom plate and securing the latter at the desired adjustment, a fuel feeding ram supported by said bottom plate and movable along the bottom plate relative thereto, means for driving said beater, and means for reciprocating said ram.

2. The combination of a furnace formed with a fuel opening and an air inlet opening spaced downwardly from and in vertical alignment with the fuel opening, a supporting plate hingedly mounted on the furnace, a feed casing fixedly mounted on the supporting plate and having a discharge opening arranged to align with the fuel opening in the furnace and also having at said opening an integral rearwardly projecting wall portion extending into the fuel opening of the furnace, and an integral inclined plate extending forwardly and upwardly from said integral wall portion, means in said casing forward of said inclined plate for forcibly feeding fuel from the casing into the furnace, a blower suspended from and supported by the feed casing, and having an air outlet extending into the furnace through the aforementioned air inlet opening, brackets extending from said supporting plate, a motor supported by said brackets, driving connections between said motor and blower for operating the latter, and other driving connections between said motor and the fuel feeding means for operating the latter.

CLARENCE C. LARSEN.